(12) United States Patent
Bastelberger et al.

(10) Patent No.: US 10,995,264 B2
(45) Date of Patent: May 4, 2021

(54) COATED PROPPANTS FOR FRACKING EXTRACTION METHODS

(71) Applicant: WACKER CHEMIE AG, Munich (DE)

(72) Inventors: Thomas Bastelberger, Emmerting (DE); Abdulmajid Hashemzadeh, Burghausen (DE); Stephan Karpfhammer, Stammham (DE); Arndt Schlosser, Stammham (DE)

(73) Assignee: Wacker Chemie AG, Munich (DE)

( * ) Notice: Subject to any disclaimer, the term of this patent is extended or adjusted under 35 U.S.C. 154(b) by 126 days.

(21) Appl. No.: 16/338,162

(22) PCT Filed: Sep. 30, 2016

(86) PCT No.: PCT/EP2016/073482
§ 371 (c)(1),
(2) Date: Mar. 29, 2019

(87) PCT Pub. No.: WO2018/059714
PCT Pub. Date: Apr. 5, 2018

(65) Prior Publication Data
US 2020/0157414 A1    May 21, 2020

(51) Int. Cl.
B32B 5/16      (2006.01)
C09K 8/80      (2006.01)
C08F 212/08    (2006.01)
C08F 220/06    (2006.01)
C08F 220/18    (2006.01)

(52) U.S. Cl.
CPC ............. C09K 8/805 (2013.01); C08F 212/08 (2013.01); C08F 220/06 (2013.01); C08F 220/18 (2013.01); *Y10T 428/2995* (2015.01)

(58) Field of Classification Search
CPC ............... C09K 8/805; Y10T 428/2995; Y10T 428/2998
See application file for complete search history.

(56) References Cited

U.S. PATENT DOCUMENTS

| | | | |
|---|---|---|---|
| 4,969,522 A | 11/1990 | Whitehurst et al. | |
| 5,218,038 A | 6/1993 | Johnson et al. | |
| 5,723,516 A | 3/1998 | Bigham et al. | |
| 7,624,802 B2 | 12/2009 | McCrary et al. | |
| 2002/0007009 A1 | 1/2002 | Stark et al. | |
| 2005/0244641 A1 | 11/2005 | Vincent | |
| 2006/0035790 A1* | 2/2006 | Okell | C09K 8/805 |
| | | | 507/269 |
| 2008/0098933 A1 | 5/2008 | Killat | |
| 2010/0212898 A1* | 8/2010 | Nguyen | C09K 8/5751 |
| | | | 166/280.1 |
| 2012/0232214 A1 | 9/2012 | Hashemzadeh | |
| 2014/0083696 A1 | 3/2014 | Nguyen et al. | |
| 2014/0124200 A1 | 5/2014 | Fournier | |
| 2018/0273836 A1* | 9/2018 | Singh | E21B 43/267 |

FOREIGN PATENT DOCUMENTS

| | | |
|---|---|---|
| DE | 4436047 A1 | 4/1995 |
| DE | 102006050336 A1 | 5/2008 |
| EP | 1153979 A2 | 11/2001 |
| WO | 2008088449 A2 | 7/2008 |
| WO | 2011058051 A1 | 5/2011 |
| WO | 2016070044 A1 | 5/2016 |
| WO | 2016089599 A1 | 6/2016 |

OTHER PUBLICATIONS

E. Matijevic, Chem. Mater. 1993, 5, pp. 412-426.
Ullmann's Encyclopedia of Industrial Chemistry, vol. A 23, pp. 583-660, Verlag Chemie, Weinheim, 1992.
Fox T. G., Bull. Am. Physics Soc. 1, 3, p. 123 (1956).
Polymer Handbook 2nd Edition, J. Wiley & Sons, New York (1975).
Encyclopedia of Polymer Science and Engineering, vol. 8, pp. 659-677, John Wiley and Sons, Inc., 1987.

\* cited by examiner

*Primary Examiner* — Hoa (Holly) Le
(74) *Attorney, Agent, or Firm* — Brooks Kushman P.C.

(57) ABSTRACT

The invention relates to coated support means for fracking mining methods, containing an inorganic substrate material and a coating containing polymers of one or more ethylenically unsaturated monomers from the group containing vinyl esters of unbranched or branched alkyl carboxylic acids with 1 to 15 C atoms, methacrylic acid esters and acrylic acid esters of alcohols with 1 to 15 C atoms, vinyl aromatics, olefins, dienes and vinyl halides, characterised in that the polymers are obtained by means of radical-initiated polymerisation in an aqueous medium, wherein 0.5 to 20 wt. % of ethylenically unsaturated and silane group-containing monomers are copolymerised, in relation to the total weight of the monomers.

10 Claims, No Drawings

COATED PROPPANTS FOR FRACKING EXTRACTION METHODS

CROSS-REFERENCE TO RELATED APPLICATIONS

This application is a U S. National Phase Application of PCT/EP2016/073482, filed Sep. 30, 2016 the contents of which are incorporated herein by reference in their entireties for all purposes.

FIELD OF THE INVENTION

The present invention relates to coated proppants comprising an inorganic carrier material and a polymer of ethylenically unsaturated monomers for coating it, to methods for producing the coated proppants, and to the use of the coated proppants in tracking production methods for mineral oil and natural gas.

BACKGROUND OF THE INVENTION

The tracking method is used in mineral oil and natural gas production and is a technique of generating, widening, and stabilizing cracks in the rock of a deposit deep underground, with the airs of increasing the permeability of the deposit rocks. As a result, gases or liquids present therein are able to flow more easily and more stably to the well and be recovered.

The cracks generated have to be kept open with proppants. The coated or uncoated proppants currently available are brittle and do not have the necessary compressive strength for production at great depths. The breaking of the proppant under the high pressure releases fine particles that block the cracks and reduce the oil or gas production rate.

The coated proppants available according to the prior art have improved stability compared to the uncoated proppants. However, the effect of the coating, with organic resins, for example, is limited by the fact that the available coatings are themselves very brittle and likewise have a tendency to break or to flake off.

U.S. Pat. No. 4,969,522 describes polymer-coated proppants which are produced by polymerization of polyethylenically unsaturated monomers in the presence of silica gel or sand. U.S. Pat. No. 5,218,038 relates to proppants coated with crosslinkable phenolic resins. US 2005/0244641 A1 discloses proppants coated with hydrophobic materials such as silicones or siloxanes. Proppants fir use in fracking are also described in US 2006/0035790 A1, where finely divided carrier particles of sand are coated with elastomer—with polyolefins or polyurethanes, for example. U.S. Pat. No. 7,624,802 describes proppants composed of phenolic-resin-coated carrier materials from the group of inorganic or organic materials or composites of inorganic and organic materials. WO 2008/088449 A2 describes proppants having a coating composed of resin, crosslinker, adhesion promoter, and curing agent. US 2014/0124200 A1 discloses proppants having a coating composed of silicone-modified formaldehyde resins. WO 2016/070044 A1 describes a method for treating proppants with a series of functional coatings. WO 2016/089599 A1 describes proppants having a coating which comprises treatment agents.

BRIEF SUMMARY OF THE INVENTION

The object of the present invention was to provide proppants possessing suitability for use in tracking production methods for mineral oil and natural gas. These proppants ought to have the necessary hardness and at the same time to display elastic qualities, so as to minimize breaking or flaking of the coating. In the event of breaking or flaking, the fragments ought to form agglomerates.

DETAILED DESCRIPTION OF PREFERRED EMBODIMENTS

Subject matter of the invention are coated proppants for tracking production methods, comprising an inorganic carrier material and a coating comprising polymers of one or more ethylenically unsaturated monomers from the group containing vinyl esters of unbranched or branched alkylcarboxylic acids having 1 to 15 carbon atoms, methacrylic esters and acrylic esters of alcohols having 1 to 15 carbon atoms, vinylaromatics, olefins, dienes, and vinyl halides, characterized in that the polymers are obtained by radically initiated polymerization in aqueous medium, where 0.5 to 20 wt % of ethylenically unsaturated monomers comprising silane groups are copolymerized, based on the total weight of the monomers.

Suitable inorganic carrier materials have long been known to the skilled person from the prior art and can be used for the proppants of the invention. The carrier materials are customarily sand or rocks such as limestone, marble, dolomite, granite, but also glass beads, ceramic particles, ceramic spheres, and the like, this list being illustrative and nonlimiting. The carrier particles preferably exhibit a substantially spherical form, since this form allows sufficient interspace so that the crude oil or gas can flow past. Sand, glass beads, and hollow glass spheres (known as microballoons) are preferred carrier materials. A particularly preferred carrier material used is sand. The carrier material particles preferably have an average diameter of 50 to 5000 μm, more preferably an average diameter of 100 to 1500 μm.

The coating of the carrier materials comprises polymers of one or more ethylenically unsaturated monomers from the group containing vinyl esters of unbranched or branched alkyl carboxylic acids having 1 to 15 carbon atoms, methacrylic esters and acrylic esters of alcohols having 1 to 15 carbon atoms, vinylaromatics, olefins, dienes, and vinyl halides. Preferred vinyl esters are vinyl acetate, vinyl propionate, vinyl butyrate, vinyl 2-ethyl hexanoate, vinyl laurate, 1-methyl vinyl acetate, vinyl pivalate, and vinyl esters of alpha-branched monocarboxylic acids having 9 to 13 carbon atoms, as for example VeoVa9® or VeoVa10® (tradenames of Momentive). Vinyl acetate is particularly preferred.

Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Particularly preferred are methyl acrylate, methyl methacrylate, n-butyl acrylate and 2-ethylhexyl acrylate. Examples of olefins and dienes are ethylene, propylene, and 1,3-butadiene. Suitable vinylaromatics are styrene and vinyltoluene. A preferred vinyl halide is vinyl chloride.

The ethylenically unsaturated monomers comprising silane groups are monomers with the general formula $RSi(CH_3)_{0-2}(OR^1)_{3-1}$, where R has the definition $CH_2=CR^2-(CH_2)_{0-1}$ or $CH_2=CR^2CO_2-(CH_2)_{1-3}$, $R^1$ is an unbranched or branched, optionally substituted alkyl radical having 1 to 12 carbon atoms and may optionally be interrupted by an ether group, and $R^2$ is H or $CH_3$.

Preferred are silanes of the formulae $CH_2=CR^2-(CH_2)_{0-1}Si(CH_3)_{0-1}(OR^1)_{3-2}$ and $CH_2=CR^2CO_2$ —(CH$_2$)$_3$Si(CH$_3$)$_{0-1}$ (OR$^1$)$_{3-2}$, where R$^1$ is a branched or unbranched alkyl radical having 1 to 8 carbon atoms and R$^2$ is H or CH$_3$.

Particularly preferred ethylenically unsaturated silanes are vinylmethyldimethoxysilane, vinyltrimethoxysilane, vinylmethyldiethoxysilane, vinyltriethoxysilane, vinyltri(2-methoxyethoxy) silane, γ-methacryloxypropyltrimethoxysilane, γ-methacryloxypropyltriethoxysilane, γ-acryloxypropyltrimethoxysilane, γ-acryloxypropyltriethoxysilane.

The stated ethylenically unsaturated silane compounds may optionally also be present in the form of their (partial) hydrolysates.

Preferably additionally 0.05 to 20 wt %, more preferably 0.1 to 10 wt %, of one or more functional comonomers, based on the total weight of the monomers, are copolymerized. Examples of functional comonomers are ethylenically unsaturated monocarboxylic and dicarboxylic acids, preferably acrylic acid, methacrylic acid, fumaric acid, and maleic acid, and also maleic anhydride; ethylenically unsaturated carboxamides and carbonitriles, preferably acrylamide and acrylonitrile; ethylenically unsaturated sulfonic acids and salts thereof, preferably vinyl-sulfonic acid, 2-acrylamido-2-methylpropanesulfonic acid. Other examples of functional comonomers are epoxide-functional comonomers such as glycidyl methacrylate and glycidyl acrylate. Examples of functional comonomers would also include monomers having hydroxyl groups, examples being methacrylic acid hydroxyalkyl esters and acrylic acid hydroxyalkyl esters such as hydroxyethyl or hydroxypropyl or hydroxybutyl acrylate or methacrylate. Ethylenically unsaturated monocarboxylic and dicarboxylic acids are preferred.

Preferred are the polymers of vinyl esters, especially vinyl acetate, with 0.5 to 20 wt % of ethylenically unsaturated monomers comprising silane groups, such as vinyltrimethoxysilane, vinyltriethoxysilane, vinylmethyldimethoxysilane or vinylmethyldiethoxysilane, and optionally 0.1 to 10 wt % of ethylenically unsaturated carboxylic acids, such as acrylic acid or methacrylic acid, where the polymers may optionally in each case additionally include 5 to 45 wt % of one or more monomer units from the group encompassing vinyl esters—different to the copolymerized vinyl esters—of unbranched or branched alkyl carboxylic acids having 3 to 15 carbon atoms, methacrylic esters and acrylic esters of alcohols having 1 to 15 carbon atoms, styrene, ethylene, butadiene, and vinyl chloride, and where the figures in wt % add up to 100 wt % in each case.

Preferred also are the polymers of (meth)acrylic esters of alcohols having 1 to 15 carbon atoms, such as methyl (meth)acrylate and/or n-butyl (meth)acrylate, with 0.5 to 20 wt % of ethylenically unsaturated monomers comprising silane groups, such as vinyltrimethoxysilane, vinyltriethoxysilane, vinylmethyldimethoxysilane or vinylmethyldiethyoxysilane, and optionally 0.1 to 10 wt % of ethylenically unsaturated carboxylic acids, such as acrylic acid or methacrylic acid, and optionally 0.1 to 50 wt %, preferably 5 to 30 wt %, of styrene; where the figures in wt % add up to 100 wt % in each case.

The monomer selection and/or the selection of the weight fractions of the comonomers are made such that in general the resulting glass transition temperature Tg is from +10° C. to +100° C. the glass transition temperature Tg of the polymers can be determined in a known way by DSC (Differential Scanning Cal-orimetry, DIN EN ISO 11357-1/2), using for example the DSC1 dynamic scanning calorimeter from Mettler-Toledo in an open crucible with a heating rate of 10 K/min. The glass transition temperature taken is the temperature at the midpoint of the step of the second heating curve in the heat flow diagram (midpoint=half step height of the heat flow step). The Tg may also be calculated approximately in advance using the Fox equation. According to Fox T. G., Bull. Am. Physics Soc. 1, 3, page 123 (1956): 1/Tg x1/Tg1+x2/Tg2+ ... +xn/Tgn, where xn is the mass fraction (wt %/100) of the monomer n, and Tgn is the glass transition temperature in kelvins of the homopolymer of the monomer n. Tg values for homopolymers are listed in Polymer Handbook 2nd Edition, J. Wiley & Sons, New York (1975).

The polymers can be prepared by the emulsion polymerization process, as described for example in Encyclopedia of Polymer Science and Engineering, Vol. 8, pages 659 to 677, John Wiley and Sons, Inc., 1987 or in DE 102006050336 A1. In this case the ethylenically unsaturated monomers are polymerized in an aqueous medium in the presence of emulsifier and/or protective colloid by means of radically initiated polymerization. Aqueous dispersions of the polymers are obtained, preferably with a solids content of 40 to 70%.

The polymers for the coating may also be used in the form of composite particles composed of the organic polymer and at least one inorganic solid, in which case the weight fraction of inorganic solid is 15 to 40 wt %, based on the total weight of organic polymer and inorganic solid in the composite particle.

Composite particles are state of the art and are available commercially, and may take the form of aqueous particle dispersions or water-dispersible polymer powders. Composite particles comprise an organic polymer phase with finely divided inorganic solid particles dispersed therein, these particles being linked preferably by physical bonds (for example, via carboxyl-functional monomer units in the polymer) or via chemical bonds (for example, via silicon-functional monomer units in the polymer) to the polymer chains of the organic polymer phase.

Preferred as finely divided, inorganic solid particles are metal oxides or semimetal oxides. These preferably have a particle size, for the solid particles dispersed in water, of 4 to 150 nm, more preferably 5 to 100 nm. The particle size is the weight-average particle size dw, determined by statistical light scattering measurement, using the Nanosizer from Coulter, for example.

Examples of suitable metal oxides are the oxides of titanium, zirconium, aluminum, barium, magnesium or iron. Metal oxides of these kinds are available commercially, examples being titanium dioxide, zirconium(IV) oxide, tin (II) oxide, tin(IV) oxide, aluminum oxide, hydroxyaluminum oxide, barium oxide, magnesium oxide, iron(II) oxide, iron(III) oxide, iron(II/III) oxide. A preferred semimetal oxide might be silicon dioxide. Silicon dioxide may be present in amorphous form and/or in various crystal structures. Silicon dioxide may take the form, for example, of water glass or silica sols. Suitable silicon dioxide is also known under the tradenames Aerosil®, Nalco®, Levasil®, Ludox®, Nyacol®, Bindzil® and Snowtex®. Particularly preferred are silica sols, and aluminate- or epoxysilane-modified silica sols. To prepare the modified silica sols, either an aqueous aluminate solution, NaAl(OH)$_4$, for example, or an epoxysilane, 3-glycidoxypropyltrimethoxysilane for example, is added with stirring and optionally with heating to a conventional silica sol.

The preparation of the finely divided inorganic solids is known to the skilled person and is accomplished, for example, by precipitation reactions or chemical reactions in the gas phase (in this regard cf. E. Matijevic, Chem. Mater.

1993, 5, pages 412 to 426; Ullmann's Encyclopedia of Industrial Chemistry, Vol. A 23, pages 583 to 660, Verlag Chemie, Weinheim, 1992.

Composite particles comprising an organic polymer and finely divided inorganic solid particles may be prepared using the methods identified above as being state of the art. The finely divided inorganic solid particles here are used preferably in the form of a stable, aqueous dispersion of solids.

An aqueous dispersion comprising the finely divided, inorganic solids is preferably added during the polymerization, in the production of the organic polymer, or is added to the completed polymer dispersion. Also preferred is a method wherein an aqueous dispersion of the finely divided inorganic solids is mixed with the polymer dispersion, so that a chemical or physical binding can take place between the inorganic and the organic particles.

Likewise preferred is a method wherein an aqueous dispersion comprising finely divided inorganic solids is mixed with an aqueous polymer dispersion and with an epoxy silane compound, as for example 3-glycidoxypropyltrimethoxysilane or 3-glycidoxypropylmethyldiethoxysilane.

The stated mixing operations are carried out preferably at a temperature of 20° C. to 70° C. over a period of preferably 1 to 12 hours.

The composite particles at least partly have a core-shell structure. In this structure, the inorganic particles form a core and the polymeric chains a shell. The weight fraction of inorganic solid in the composite particles is 15 to 45 wt %, based on the total weight of organic polymer and inorganic solid in the composite particle.

The composite particles thus obtainable are present generally in the form of an aqueous dispersion, preferably with a solids content of 40 to 70%, more preferably of 45 to 65%, and most preferably of 50 to 60%.

A further subject of the present invention is the method for producing proppants coated in accordance with the invention.

The skilled person is aware of diverse possibilities for the coating of proppants, from the prior art. These methods can also be used for coating proppants with the present polymers. In one preferred embodiment, the polymer in the form of an aqueous polymer dispersion or aqueous composite dispersion is applied to the inorganic carrier material, by impregnation or spraying or mixing, for example, and then dried. During application of the coating, it is also possible for additives to be added as well, examples being adhesion promoters, antistats. Application and drying take place preferably at a temperature of 20° C. to 50° C.

In the coated proppants, the surface of the proppant may have complete or partial coating. When examined under the scanning electron microscope, preferably at least 50% of the visible surface of the inorganic carrier material, appears coated with the polymer, more preferably at least 95%. The coating on the carrier material is 0.1 to 100 μm thick, preferably 0.1 to 30 μm. The coated proppants are preferably coated with fewer than three coats, more preferably with only one coat.

The coating is applied in general in an amount of 0.1 to 0.10 wt %, preferably of 0.5 to 5 wt %, and more preferably of 0.5 to 2 wt %, to the inorganic carrier material, based in each case on the total weight of the proppant.

A further subject of the present invention is the use of the coated proppants in fracking production methods for mineral oil and natural gas.

The advantages of the coated proppants of the invention may be summarized as follows:

In contrast to the coated proppants from the prior art, the polymers in the form of their aqueous polymer dispersions can be applied and dried at substantially lower temperatures, since in contrast to crosslinking systems they are not heat-curing, with film formation instead taking place via coalescence. In contrast to crosslinking novolac coatings, the curing or drying also takes place without release of VOCs such as formaldehyde.

The aqueous dispersions of the polymers or of the polymer composites have a relatively low viscosity and therefore exhibit substantially better spreading when the coating is applied. As a result, surfaces are coated more evenly, and smoother surfaces can be obtained.

The coated proppants exhibit enhanced elasticity and deformability for the same hardness. As a result, the proppants are more robust in the face of loads, such as impacts, deformation or pressure, and have a lower tendency to break. Conventional, prior-art proppants are very brittle and have a great tendency to break. Breakage of the proppant releases fine fractions. Release of the fine fractions is detrimental to the transit rate of the flow of crude oil or gas, because the interspaces between the proppant particles become clogged. With the proppants coated in accordance with the invention, conversely, the fine fractions undergo agglomeration on breakage, and the release of fine fractions is prevented, or at least drastically reduced.

By virtue of these advantageous properties of the proppants coated in accordance with the invention, the flow of oil or gas can be maintained for longer. This produces decisive advantages in economics and in protecting the environment.

The examples hereinafter elucidate the invention, without having any limiting effect.

Example 1 (Polymer Dispersion 1)

A reactor with a volume of 3 liters was charged with 1.0 g of deionized water, 4.6 g of sodium lauryl sulfate, and 1.4 g of potassium peroxodisulfate under a nitrogen atmosphere and this initial charge was heated to 40° C. with stirring. At that temperature a mixture with the following composition was introduced into the reactor:

| | |
|---|---|
| Vinyltriethoxysilane | 0.8 g |
| Methacrylic acid | 8.5 g |
| Butyl acrylate | 100.8 g |
| Dodecyl mercaptan | 0.3 g |
| Methyl methacrylate | 40.7 g |
| Styrene | 18.7 g |

Subsequently the temperature was raised to 80° C. and, on attainment of this temperature, the initiator solution (1.4 g of potassium peroxodisulfate in 86.8 g of water) was metered in over the course of three hours; simultaneously but separately, over the course of 2.5 hours, a solution having the following composition was introduced into the reactor:

| | |
|---|---|
| Vinyltriethoxysilane | 3.7 g |
| Methacrylic acid | 37.1 g |
| Butyl acrylate | 440.8 g |
| Dodecyl mercaptan | 1.48 g |
| Methyl methacrylate | 177.8 g |
| Styrene | 81.5 g |

After the end of the metered additions, stirring took place at 80° C. for two hours and at 85° C. for one hour.

The polymer dispersion was subsequently diluted with water and the pH was adjusted to 9 using an aqueous ammonia solution (12.5% strength). This gave a polymer solution having a solids content (DIN EN ISO 3251) of 43.0 wt %. The minimum film formation temperature (DIN ISO 2115) was 5° C.

Example 2 (Composite Dispersion 2)

A jacketed reactor was charged at 50° C. and with stirring with 1000 g of the 43%, aqueous polymer dispersion 1, and 460 g of an aqueous silica sol (solids content 40%, Bindzil 2040 from Akzo Nobel) were added.

The resulting dispersion had a solids content of 42.7% and a silica content of 30 wt %, based on the total solids content.

Production of Coated Proppants:

In a Lödige mixer, 2 wt %, based on sand, ox the dispersions from examples 1 and 2 were sprayed using a nozzle onto fracking sand of 12/18 mesh and, respectively, 20/40 mesh, and the dispersions were dried at 80° C.

Investigation of the Coating Quality of Fracking Sand by Electron Microscope (SEM):

A surface coverage of >95% was achieved in each case.

Investigation of the Pressure Stability of Coated Proppants:

The pressure stability of the coated proppants was investigated in each case in accordance with DIN EN ISO 13503-2 at 7500 psi and 10000 psi pressure.

The results are shown in tables 1 and 2.

TABLE 1

| Fracking sand 12/18 coated with dispersion from | Amount of fine fraction formed in % | |
|---|---|---|
| example | at 7500 psi | at 10000 psi |
| 1 | 7% | 12% |
| 2 | 3% | 8% |
| Comparative example, uncoated sand 12/18 | 15% | 22% |

TABLE 2

| Fracking sand 20/40 coated with dispersion from | Amount of fine fraction formed in % | |
|---|---|---|
| example | at 7500 psi | at 10000 psi |
| 1 | 3% | 6% |
| 2 | 1% | 3% |
| Comparative example, uncoated sand 20/40 | 6% | 10% |

With the proppants of the invention, the result in each case is a much smaller fine fraction after pressure loading.

The invention claimed is:

1. A coated proppant for use in fracking, comprising an inorganic carrier material and a coating comprising a copolymer of a first group of one or more ethylenically unsaturated monomers selected from the group consisting of vinyl esters of unbranched or branched $C_{1-15}$ alkylcarboxylic acids, methacrylic esters and acrylic esters of $C_{1-15}$ alcohols, vinylaromatics, olefins, dienes, and vinyl halides, wherein the copolymers are obtained by radically initiated polymerization in aqueous medium, and wherein 0.5 to 20 wt % based on the total weight of all monomers, of at least one monomer of a second group of ethylenically unsaturated monomers comprising silane groups, are copolymerized together with the one or more monomers of said first group of ethylenically unsaturated monomers.

2. The coated proppant as claimed in claim 1, wherein the second group of ethylenically unsaturated monomers comprising silane groups are monomers of the formula RSi$(CH_3)_{0-2}(OR^1)_{3-1}$, where R is $CH_2{=}CR^2{-}(CH_2)_{0-1}$ or $CH_2{=}CR^2CO_2{-}(CH_2)_{1-3}$, $R^1$ is an unbranched or branched, optionally substituted alkyl radical having 1 to 12 carbon atoms the carbon atoms optionally interrupted by an ether group, and $R^2$ is H or $CH_3$.

3. The coated proppant as claimed in claim 2, wherein the coating comprises copolymers of ethylenically unsaturated vinyl esters of $C_{1-2}$ carboxylic acids and 0.5 to 20 wt % of ethylenically unsaturated monomers comprising silane groups, and optionally 0.1 to 10 wt % of ethylenically unsaturated carboxylic acids, wherein the copolymers optionally include 5 to 45 wt % of one or more monomer units selected from the group consisting of vinyl esters of unbranched or branched $C_{3-15}$ alkyl carboxylic acids, methacrylic esters and acrylic esters of $C_{1-15}$ alcohols, styrene, ethylene, butadiene, and vinyl chloride; and wherein the figures in wt % add up to 100 wt %.

4. The coated proppant as claimed in claim 1, wherein the coating comprises copolymers of (meth)acrylic esters of $C_{1-15}$ alcohols, 0.5 to 20 wt % of ethylenically unsaturated monomers comprising silane groups, optionally 0.1 to 10 wt % of ethylenically unsaturated carboxylic acids, and optionally 0.1 to 50 wt %, of styrene; wherein the figures in wt % add up to 100 wt %.

5. The coated proppant as claimed in claim 1, wherein the coating comprises composite particles comprising the copolymer and particles of at least one inorganic solid, wherein the weight fraction of inorganic solid is 15 to 40 wt %, based on the total weight of copolymer and inorganic solid in the composite particles.

6. The coated proppant as claimed in claim 5, wherein the inorganic solid particles are metal oxides or semimetal oxides.

7. The coated proppant as claimed in claim 1, wherein the inorganic particles comprise sand, rocks, glass beads, ceramic particles, ceramic spheres, or mixtures thereof.

8. The coated proppant as claimed in claim 1, wherein the inorganic particles have an average diameter of 50 to 5000 μm.

9. A method for producing coated proppants as claimed in claim 1, applying the copolymer as an aqueous copolymer dispersion or aqueous composite particle dispersion to an inorganic carrier material and drying to form coated proppants.

10. The coated proppants as claimed in claim 1, wherein the coated proppant is used in fracking methods for mineral oil and natural gas.

* * * * *